May 6, 1930. L. G. SIMJIAN 1,756,959
POSE REFLECTING SYSTEM FOR PHOTOGRAPHIC APPARATUS
Filed July 26, 1928
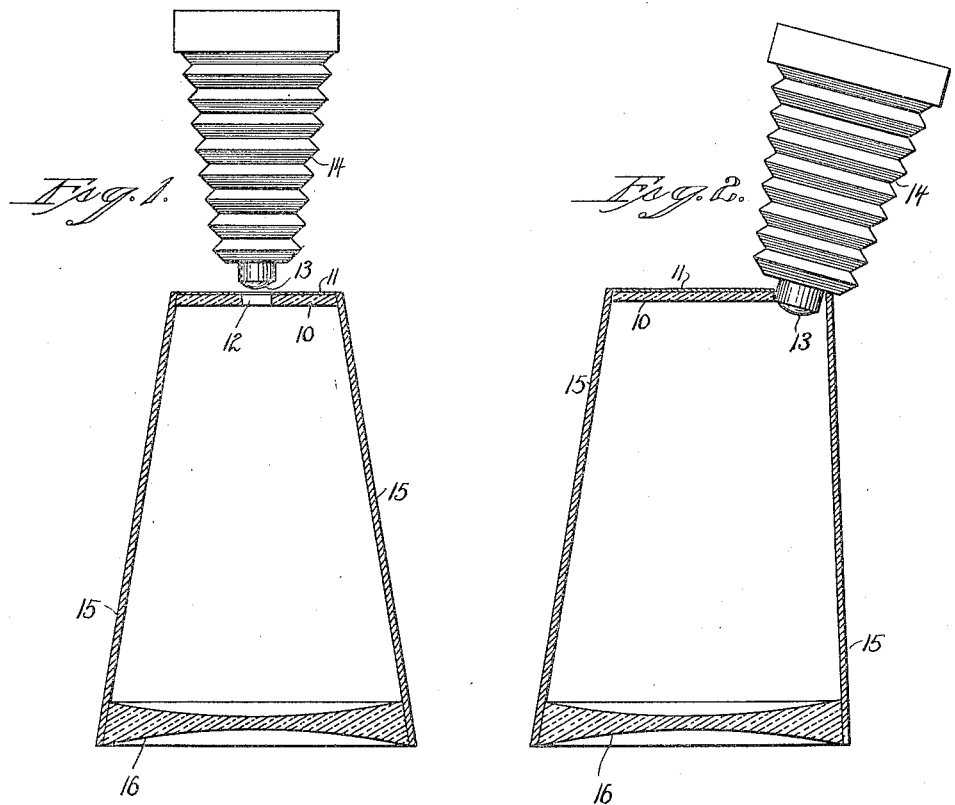

Patented May 6, 1930

1,756,959

UNITED STATES PATENT OFFICE

LUTHER G. SIMJIAN, OF NEW HAVEN, CONNECTICUT

POSE-REFLECTING SYSTEM FOR PHOTOGRAPHIC APPARATUS

Application filed July 26, 1928. Serial No. 295,565.

This invention relates to an improvement in pose-reflecting systems for photographic apparatus and particularly to pose-reflecting systems designed for use in connection with automatic and semi-automatic photographic machines, though not so limited.

The object of this invention is to provide a pose-reflecting system for photographic apparatus which will enable a person being photographed to observe before his photograph is taken, a reduced-scale reflection of substantially the identical image which a camera will record when operated, so that he may be guided in assuming a pose suitable to his taste.

A further object of this invention is to produce a pose-reflecting system of the type above described in which the lens-system of the camera will be so reduced in apparent size from the poser's standpoint as to be unobtrusive and practically invisible.

With these objects in view my invention consists in a pose-reflecting system for photographic apparatus characterized by a pose-reflecting mirror, an image-reducing lens interposed between the said mirror and the poser, and a camera having its lens-system arranged to photograph an image from the said image-reducing lens, whereby a poser may observe in the said mirror a reduced-scale reflection of the image of himself which the said camera will record from the said image-reducing lens, and whereby the lens-system of the said camera is so reduced in apparent size as to be rendered unobtrusive by the reducing action of the said image-reducing lens.

My invention further consists in a pose-reflecting system for photographic apparatus characterized as above and having certain other details of construction and combinations of parts as will be hereinafter described and particularly recited in the claims.

In the accompanying drawings:

Fig. 1 is a schematic sectional view showing one form which my invention may assume; and Fig. 2 is a corresponding view illustrating another form which my invention may assume.

In carrying out my invention as shown in Fig. 1, I employ a pose-reflecting mirror 10 preferably made of glass and having a reflecting-coating 11 upon its rear face. Passing centrally through the said pose-reflecting mirror and its coating is an aperture 12 having the outer end of the lens-system 13 of a camera 14 arranged axially in line with it.

Extending forward from the mirror 10, which is preferably but not necessarily flat, is a tapered hood or shield 15 having mounted in its forward end an image-reducing lens 16 commonly known as a "minus" lens and as shown interposed between the poser represented by the circle A and the said pose-reflecting mirror.

The hood or shield 15 serves to prevent light other than that passing through the lens 16 from being reflected by the mirror 10.

A poser A positioned in front of the image-reducing lens 16 and looking therethrough will see in the image-reflecting mirror 10 a reduced-scale reflection of the image of himself which the camera 14 will record through the aperture 12 when operated for that purpose. The said aperture and the outer end of the lens-system 13 of the camera will by the reducing action of the image-reducing lens 16 be reduced to such proportions as to be unobtrusive and practically invisible to the eye of the poser.

In Fig. 2 of the drawings I have shown a pose-reflecting mirror 10 which, however, in this arrangement of parts is not provided with an aperture, but the outer end of the lens-system 13 of the camera 14 is positioned to one side thereof so as to obliquely photograph the image of the poser from the reducing-lens 16.

The apparent slight distortion of the image of the poser recorded by the camera will, as has been found by experiment, be largely if not entirely offset by the presence of the image-reducing lens 16 between the said camera and the poser or subject. As far as I have been able to ascertain from experiments, the camera seems to photograph the image from the surface of the image-reducing lens 16, rather than directly from the poser. This theory in large part accounts for the absence of distortion.

In the construction just above described it will be apparent also that the poser may, as in the construction first described, observe a reduced-scale reflection of the image of himself which the camera will record when it is operated for the purpose.

I thus provide a simple and convenient pose-reflecting system which enables the photograph to be recorded by the camera without the necessity of elaborate mechanisms which, when operated, startle and disconcert the poser who meanwhile is able to accurately determine the character of the photograph which the camera will record. Furthermore, as above pointed out, the apparent size of the lens-system of the camera is reduced to such proportions as to be unobtrusive and practically invisible.

It is obvious of course, without further illustration that if for any reason it is desired to change the angular disposition of the camera, prisms may be interposed between the outer end of the lens-system thereof and the said image-reducing mirror in accordance with well understood principles. For all practical purposes, any prisms or supplemental lenses thus interposed would form a part of the lens-system of the camera.

It is also obvious that the image-reducing lens may be a compound lens, built up of a concave lens and a convex lens of less power than the concave lens so that when the two are combined the resultant unit is in effect a minus lens. Compound minus lenses of this type are in more or less general use and are employed in certain situations where extremely accurate photographic action is desired.

I claim:

1. A pose-reflecting system for photographic apparatus comprising a pose-reflecting mirror; an image-reducing lens interposed between the said mirror and a poser; and a camera having its lens-system directed at the said image-reducing lens and arranged to photograph an image therefrom; whereby a poser may observe in the said mirror a reduced-scale reflection of the image of himself which the said camera will record from the said image-reducing lens, and whereby the lens-system of the said camera is so reduced in apparent size as to be rendered unobtrusive by the reducing action of the said image-reducing lens.

2. A pose-reflecting system for photographic apparatus comprising a pose-reflecting mirror; an image-reducing lens interposed between the said mirror and a poser; a light-shield laterally enveloping the light-path between the said mirror and lens to prevent light, other than that passing through the lens, from being reflected by the mirror; and a camera having its lens-system directed at the said image-reducing lens and arranged to photograph an image therefrom; whereby a poser may observe in the said mirror a reduced-scale reflection of the image of himself which the said camera will record from the said image-reducing lens, and whereby the lens-system of the said camera is so reduced in apparent size as to be rendered unobtrusive by the reducing action of the said image-reducing lens.

3. A pose-reflecting system for photographic apparatus comprising a pose-reflecting mirror provided with an aperture; an image-reducing lens interposed between the said mirror and a poser; and a camera having its lens-system directed at the said image-reducing lens and arranged to photograph an image therefrom through the aperture in the said mirror; whereby a poser may observe in the said mirror a reduced-scale reflection of the image of himself which the said camera will record from the said image-reducing lens, and whereby the lens-system of the said camera is so reduced in apparent size as to be rendered unobtrusive by the reducing action of the said image-reducing lens.

In testimony whereof, I have signed this specification.

LUTHER G. SIMJIAN.